W. L. WATERS.
LOAD REGULATING SYSTEM.
APPLICATION FILED JULY 22, 1914.

1,242,284.

Patented Oct. 9, 1917.
2 SHEETS—SHEET 1.

Witnesses:
Leonard W. Novander
[signature]

Inventor
William L. Waters
By Brown, Hanson & Boettcher
Att'ys

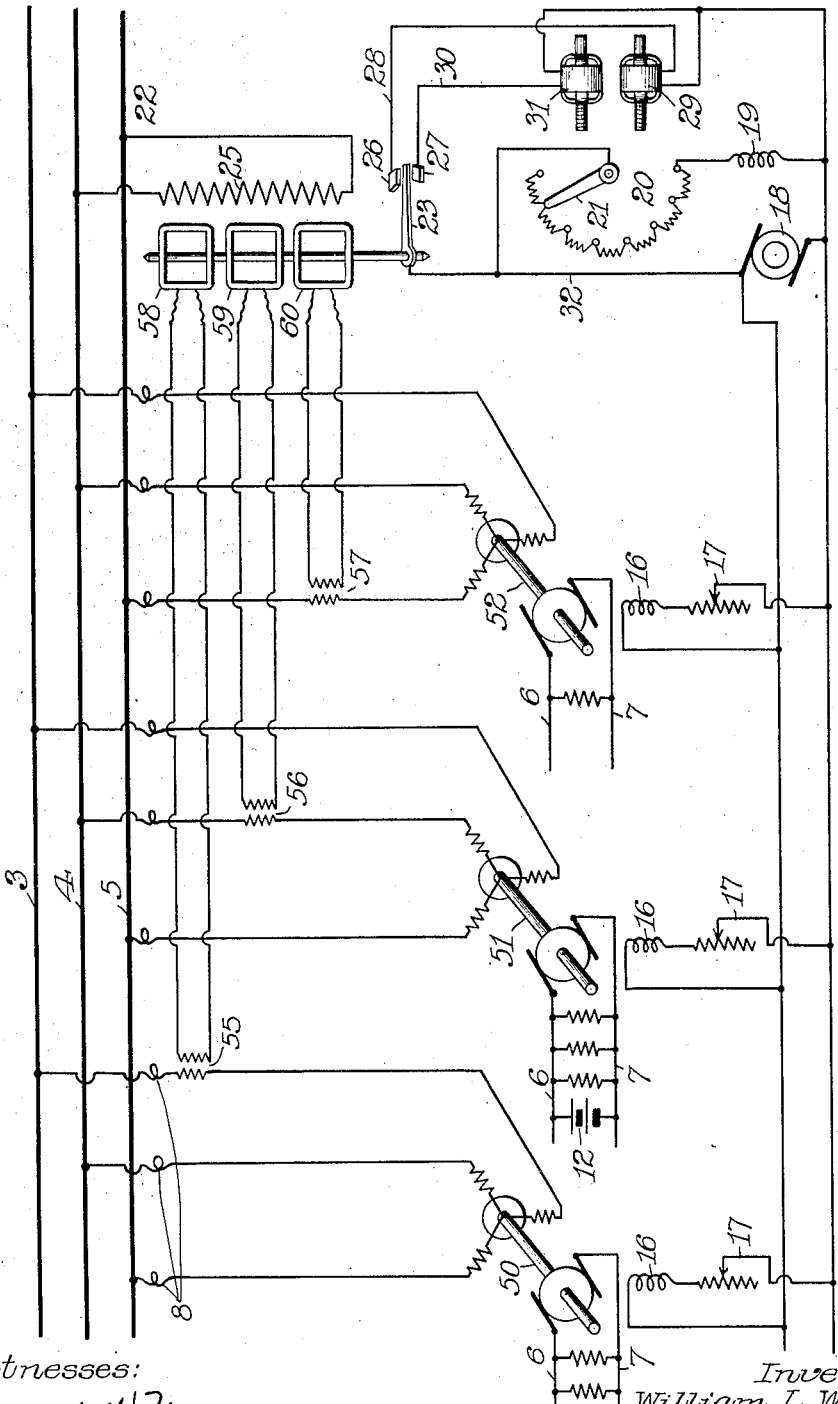

UNITED STATES PATENT OFFICE.

WILLIAM L. WATERS, OF MILWAUKEE, WISCONSIN.

LOAD-REGULATING SYSTEM.

1,242,284.      Specification of Letters Patent.      Patented Oct. 9, 1917.

Application filed July 22, 1914. Serial No. 852,512.

*To all whom it may concern:*

Be it known that I, WILLIAM L. WATERS, a citizen of the United States, residing at Milwaukee, in the county of Milwaukee and State of Wisconsin, have invented certain new and useful Improvements in Load-Regulating Systems, of which the following is a full, clear, concise, and exact description, reference being had to the accompanying drawings, forming a part of this specification.

The subject-matter of this invention is a load regulating system.

A power generating station can be operated at maximum efficiency only when all the apparatus is operating continuously under full load. This can be secured only where there is a constant demand for the entire load of a station.

Consumers can secure the most favorable contract for purchasing power by conforming as nearly as possible to the above requirements. A contract for continuous power at a flat rate is necessarily based on a maximum demand. The consumer must then find means for regulating his demand so that it will not exceed the maximum, but will be practically constant at the maximum.

One of the objects of this invention is to provide an improved system of load regulation which will maintain the rate of drawing energy from the supply mains at or below a predetermined value.

In the drawings,

Fig. 3 is a diagram of a modification.

Figure 1:
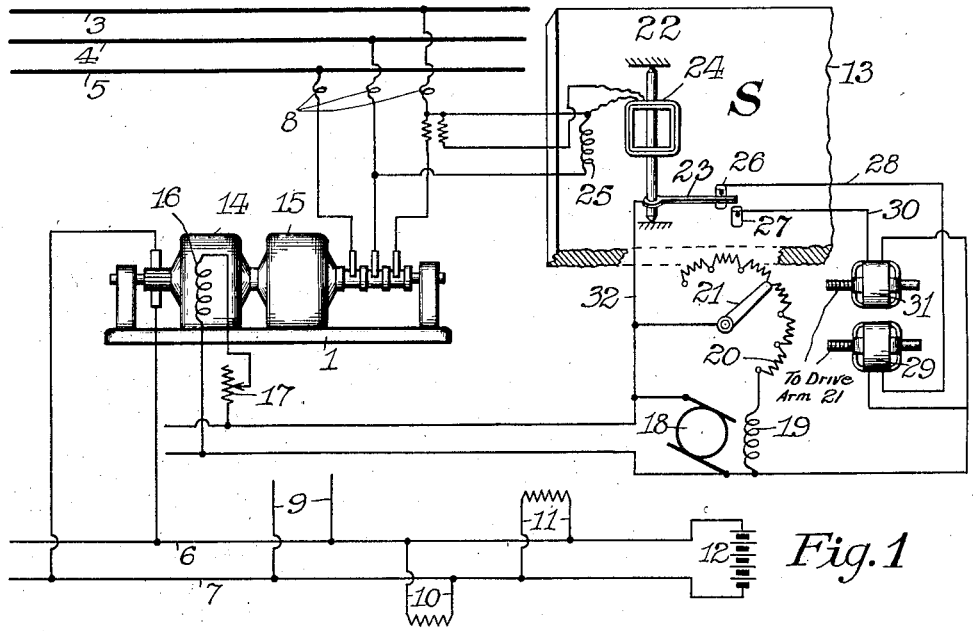
Figure 1 is a diagrammatic illustration of a system embodying my invention.

A maximum demand limitation is a limitation upon the rate at which work is done, that is to say, on the rate of wattage consumed. This rate may be controlled by controlling either current or voltage.

In case the consumer receives electrical power in a form in which it must first be transformed or translated before he can use it, it becomes imperative to limit the flow of energy into the transforming or translating devices when the load becomes a maximum. This could be done by regulating the current or voltage of the electrical energy as supplied, but there are certain practical disadvantages or limitations in doing this. Due to the economy of transmission, power is usually delivered in the form of high-tension alternating-current. This is difficult to regulate because of either the high voltage or the quantity of current.

My invention provides means for readily limiting the load taken by the consumer without handling currents of excessive pressure or quantity and with a minimum of waste. Instead of attempting to limit the current or the voltage impressed on the transforming or translating devices, I regulate the voltage of the transformed or translated energy, that is to say, if the demand increases, I maintain the load upon the supply mains constant by decreasing the voltage of the consumption circuits.

This invention relates, not only to the control of the withdrawal of electric energy from the electrical supply mains, but is useful as well for the control of the rate at which the energy is drawn from any similar supply mains in such cases as it is desired to come within the requirements of a predetermined maximum. In many cases electrical generators or generating units are driven by steam or water power, which power is furnished under the limitation of a predetermined maximum. In such cases, the rate of drawing energy would be decreased by lowering the voltage in the consumption circuits to keep the load within the predetermined maximum.

In the following description the term "transforming device" will be understood to mean any means for transforming energy from one form into another. This term is intended to include the above types of units as well as the various electrical devices specifically shown in the drawings. It is also to be understood that the term includes both rotary converters and motor generator sets. It is also to be noted in the following specific claims that the designation of a motor part and a generator part is not intended to designate distinct and separate parts, but means performing the two functions, as in a rotary converter, a portion of the power is transmitted from the alternating current to the direct current side by mechanical means and part is merely rectified current obtained by means of the commutator, but I intend that motor generator sets, as well as rotary converters, are to be included within the above terms.

Fig. 1 shows a motor generator set 1, drawing power from the three-phase alternating current mains 3, 4, and 5, and supplying direct current to the consumer's mains 6 and 7. The load circuits 9, 10 and 11 draw a varying amount of current from the mains 6 and 7. The control mechanism is placed at a central point upon a switchboard S, and section 13 of which has been indicated on the drawing.

This control mechanism may be at a point remote from the set 1, as the set may be placed in a substation or at any convenient point.

The excitation of the generator 14 is supplied by the field winding 16 and may be initially regulated by a rheostat 17. Current is supplied to the field winding 16 from the exciter 18, the field 19 of which is controlled in accordance with the power drawn from the supply mains. A rheostat 20, having a movable arm 21 is connected in series with the field winding 19. The setting of the arm 21 is determined in accordance with the total amount of power drawn from the supply mains. The manner in which it is accomplished will be readily apparent from the figures. This is accomplished by means of a relay 22 which is actuated in accordance with the load drawn from the supply mains 3, 4, and 5. The relay comprises two windings 24 and 25, which are analogous to the windings of a watt-meter. This relay is designated the armature relay, in that it is controlled in accordance with the wattage of a circuit to which it is connected. The contact arm 23, connected to the moving coil 24 of the armature relay, is arranged to make contact with the terminals 26 and 27. The terminal 26 is connected by wire 28 to a motor 29 and to the exciter 18. This circuit is closed by the contact arm to vary the resistance of the field 19. A motor 31 is connected in the circuit 30 attached to the contact 27. The moving arm 23 of the wattmeter relay is connected by the wire 32 to the other side of the exciter 18.

The voltage impressed upon the motor generator set may be controlled by the reactances 8, connected in the motor leads. A storage battery 12 may form a part of the consumption load circuit and may be an important element in regulating the load of certain systems. The motors 29 and 31 are connected by suitable gears, not shown, to drive the arm 21.

The operation of the above-described system will be briefly set forth: When the power demanded by the circuits 9, 10 and 11 rises to the maximum value for which the consumer has contracted, it is imperative that no more current be allowed to flow from the mains 3, 4, 5; otherwise, the extra current would be bought at a greatly advanced price, or a penalty would be incurred by exceeding the maximum. The relay 22 which is in effect a watt-meter is sensitive to the amount of power drawn from the supply mains and when the amount approaches the maximum, the arm 23 will be moved to the right and make a contact with the terminal 27. The motor 31 rotates the arm 21 to increase the resistance of the rheostat 20 and thereby reduces excitation of the field 19 of the exciter 18. The voltage of the exciter 18 is thus reduced and this, in turn, reduces the excitation of the generator 14 by decreasing the current in the field winding 16. As a consequence, the voltage of the generator 14 is reduced and, although the circuits 9, 10 and 11 demand a greater amount of power, the maximum is not exceeded because a consequent reduction of voltage prevents any increase of the power taken by the load circuits 9, 10 and 11. In certain systems, a storage battery 12 may be employed, and this storage battery will supply the extra demand for current, so that the consumption of current in the power circuits 9, 10 and 11 may greatly exceed at this time the power drawn from the mains 3, 4, and 5. Upon the decreased demand in the load circuits 9, 10 and 11, the wattmeter relay 22 will indicate the lower rate of energy being drawn from the mains and, as a consequence, will close a circuit at the terminal 26. The motor 29 is then operated to decrease the resistance of the rheostat 20 and to increase the excitation of the exciter 18. This raises the voltage of the generator 14 and the consequent flow of current through the load circuits will be increased. If this is not demanded, however, the surplus current will flow into the storage battery 12 to charge the same. In this manner, the load upon the supply mains 3, 4, and 5 will be maintained substantially at a constant value, even under considerable variations of the load drawn from the consumption mains 6, 7.

The power consumed may be measured on the consumption side of the transforming device as well as upon the supply side. The watt-meter is connected in the direct current side of the motor generator set 1. The action is the same as when the wattmeter is connected to the line side of the generator set except that it does not include the transformation losses.

Figure 2:
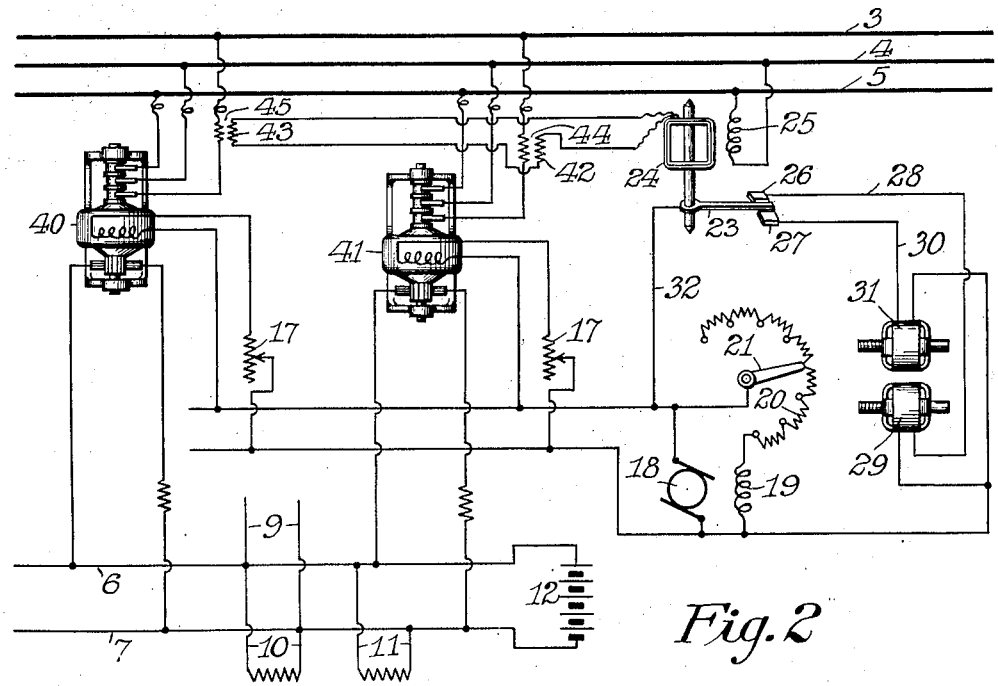
Fig. 2 is a diagram of a further development of the same.

In the manner above described, I am enabled to control the power drawn by a number of substations or by a number of units in the same substation. In Fig. 2 I have shown two transforming units 40 and 41 connected to the supply mains 3, 4 and 5. The transforming units 40 and 41 are illustrated as rotary converters, but it is evident that the same might be other apparatus, such as motor generator sets, frequency changers, etc.

The current coil 24 of the wattmeter relay is connected in series to the coils 42 and 43 of the corresponding current transformers 44 and 45, which are connected in the leads of the transformer units 40 and 41 and which indicate the current flowing to said units. The voltage coil 25 of the wattmeter relay is connected across the phase 4, 5 of the mains and indicates the voltage impressed upon the transformer units. The moving coil 24 operates the moving contact 23 in the manner indicated in connection with Fig. 1. The units 40 and 41 are excited by current from any exciter 18, which is controlled in accordance with the total power received by the two transforming units to vary simultaneously the voltage generated and supplied to the consumption mains 6 and 7 to maintain a uniform load upon the supply mains. It is not essential to my invention that both of the units 40 and 41 be connected to the same consumption circuit and it is not essential that the voltage of both of the transforming devices be thus controlled. Such a condition may be brought about by merely omitting any connection of one of the translating devices with the regulating means, or in other words, utilizing an ordinary translating means to feed another branch or consumer's circuit.

In Fig. 3 a system of load regulation similar to the systems shown in Figs. 1 and 2 is illustrated. A number of transforming units 50, 51 and 52, are supplied with current from the mains 3, 4 and 5 and deliver current to the consumption mains 6, 7, which, in this case, have been illustrated as separate service mains for each transforming unit. The field excitation for the transforming units is supplied by field windings 16 connected to the mains of the exciter 18. The current in these field windings is simultaneously regulated by varying the voltage of the exciter. Resistances 17 may be placed in the circuits of the field winding to secure the proper initial adjustment of the excitation of the transforming units.

The reactances 8 are inserted in the leads primarily for protection as for preventing surges and more particularly for limiting short circuit current. In the system illustrated in Fig. 2 the reactances 8 are used in connection with the change of field excitation to control the voltage.

The wattmeter relay in this case comprises a stationary voltage winding 25 and a plurality of movable windings 58, 59 and 60 which, in this case, have been illustrated as separate coils mounted on a common spindle. The coil 58 is connected to the secondary of the series transformer 55 which transformer is affected by the current drawn by the transforming unit 50. Coil 59 of the wattmeter relay is connected to the secondary of the current transformer 56 and is affected by the current drawn by the transforming unit 51. Coil 60 is connected to the secondary of the series transformer 57 which is affected by the current drawn by transforming unit 52. The relation of the current and the voltage coils in the wattmeter relays is such that this relay is actuated at all times in accordance with the actual power drawn by the transforming units, that is, it is actuated in accordance with watts consumed instead of volt-amperes. The transformer relay 22 is provided with a movable contact 23 playing between the contacts 26 and 27 and controls the field resistance 20 of exciter 18 in the manner described in connection with Figs. 1 and 2.

Instead of having a single exciter generator 18 I may employ an exciter at each one of the substations and may control the field circuits by means of the pilot wires 28, 30 and 32 running from the central station to the individual substations instead of running the leads from the generator 18 to the various substations. This requires substantially a duplication of the system shown in Fig. 1. As very little current would be carried by the pilot wires 32, 30 and 28, a saving in copper in this construction would be very considerable. It is understood, of course, that each one of the exciters 18 would have a rheostat 20 controlled by motors 31 and 29 and the effect of closing the circuits through the pilot wires would be to operate all the rheostats simultaneously.

The operation of this system is the same as described in connection with Fig. 2. It will be seen in connection with this system that the load taken by one unit may compensate to a degree for the load carried by the other. The watt-meter relay will not operate to cut down the voltage of the consumer's side of the system until there is danger of exceeding the maximum demand. The summation or integration of the loads taken by the various pieces of apparatus is suitably performed by the watt-meter relay 22. A pointer and scale readings may also be provided for this relay in order to indicate at all times the amount of power taken from the main.

The system above described is especially applicable to power systems where a decrease in voltage serves merely to slow down the entire system without causing any considerable inconvenience. The invention above described is applicable not only to systems converting alternating current to direct current but to any type of system employing the transforming unit, the secondary side of which is capable of voltage control.

While the invention has been described with reference to the particulars of certain systems, it is not intended thereby to limit the invention to any particular system, but, instead, I consider the above system of load regulation to be broadly new and desire that the claims be interpreted in the broadest sense of which they are capable.

What I claim as new and desire to secure by Letters Patent of the United States is:

1. In a system of load regulation, supply mains, a plurality of transforming units, leads connecting said transforming units to said supply mains, consumption circuits supplied by said transforming units, current transformers in said leads and a watt-meter relay having a coil connected in series with the secondaries of said current transformers, circuits controlled by said relay for simultaneously varying the field excitation of said plurality of said transforming units to vary the voltage impressed upon said consumption circuits.

2. In a system of load regulation, supply mains, a plurality of transforming units, leads connecting said transforming units to said supply mains, consumption circuits supplied by said transforming units, current transformers in said leads and a watt-meter relay having a moving element controlled by the combined action of said current transformers, circuits controlled by said relay for simultaneously varying the field excitation of said transforming units to vary the voltage impressed upon said consumption circuits.

3. In a system of load regulation, alternating current supply mains, supply branches connected thereto, current translators connected to said supply branches, direct current work circuits connected to said translators and receiving current therefrom, means to excite the translators, a watt meter relay to control said means, said relay having its voltage coils shunted across the mains, and its current coils interposed in the supply branches to each translator, whereby the aggregate current consumed by the work circuits through the translators may act upon the current coils of said relay, such action being obtained by the integration of loads on said work circuits.

4. In a system of load regulation, the combination of alternating current supply mains, supply branches connected thereto, current translators connected to the branches, direct current work circuits connected to said translators and receiving current therefrom, exciting means for the translators, a watt meter relay having voltage and current coils, the former connected to the mains and the latter to the branches, a variable resistance to control the strength of excitation of said translators, and said relay controlling said resistance.

5. In a system of distribution, a generator feeding consumption circuits, electrically operated means to drive the generator, means to regulate the generator, and means responsive to the power input to the driving means to control the regulating means to maintain the wattage of the consumption circuits constant regardless of change in load imposed thereupon.

6. In a system of distribution, mains, a generator, means connected to the mains to drive the generator, consumption circuits connected to the generator, regulating means for the generator, means sensitive to changes both in voltage and amperage of the mains to control the regulator, said means being connected to said regulator to continuously control the same regardless of the degree of change of load or the direction in which such change takes place on the consumption circuits so as to maintain the wattage thereof constant.

7. In a system of distribution, the combination of a generator, supply mains, means to drive the generator, means to regulate the generator, means sensitive to changes both of voltage and amperage of said mains and having connection with the regulator to control the same, and thereby maintain constant the wattage derived from the generator regardless of variation in load imposed thereon.

8. In a system of distribution, the combination of a generator, means to drive the same, automatic means to regulate the generator, and means controlling the regulator and responsive to changes both of the voltage and current supplied to the driving means so as to maintain the wattage derived from the generator constant regardless of change in load imposed thereon.

9. In a system of distribution, the combination of mains, a generator, means to drive the generator, means to regulate the generator, means sensitive to changes both of voltage and amperage of said mains and having connection with the regulator to control the same, and thereby maintain constant the wattage derived from the generator regardless of variation in load imposed thereupon, and auxiliary consumption and supply means in the work circuit.

In witness whereof, I hereunto subscribe my name this 18th day of July, A. D. 1914.

WILLIAM L. WATERS.

Witnesses:
O. W. CAMPBELL,
GEO. J. CAMPBELL.